United States Patent [19]

Jacob

[11] 3,969,649

[45] July 13, 1976

[54] CIRCUIT ARRANGEMENT FOR BICYCLE LIGHTING SYSTEMS

[76] Inventor: Walter Emil Wilhelm Jacob, Hagvretsstigen 7, 141 44 Huddinge, Sweden

[22] Filed: Oct. 15, 1974

[21] Appl. No.: 515,053

[30] Foreign Application Priority Data
Oct. 15, 1973   Sweden .............................. 7313999

[52] U.S. Cl. ................................... 315/78; 240/7.6; 315/185 R; 315/257; 315/324
[51] Int. Cl.² ........................................... B60Q 1/00
[58] Field of Search ............ 315/76, 78, 185 R, 254, 315/257, 288, 289, 312, 324; 240/7.55, 7.6; 322/1; 310/67 A

[56] References Cited
UNITED STATES PATENTS

| | | | |
|---|---|---|---|
| 1,110,658 | 9/1914 | Thomas | 315/254 X |
| 3,287,601 | 11/1966 | Collucci | 315/257 X |
| 3,377,508 | 4/1968 | Gomonut | 315/257 X |

Primary Examiner—James B. Mullins
Attorney, Agent, or Firm—Woodhams, Blanchard and Flynn

[57] ABSTRACT

A circuit arrangement for bicycle lighting systems including a dynamo having an output winding. Front and rear lamps connected in series across the winding. A tap divides the winding into two parts, the lamps each connecting to a corresponding winding part and interconnecting at a junction joint. An impedance is interposed between the tap and lamp junction point. The number of turns and resistances of the winding parts are of value such that the junction point and tap are at the same potential, establishing system equilibrium, under normal operating conditions, despite variation in dynamo voltage and lamp resistance with bicycle speed. The impedance may be provided as the inherent resistance of a further winding connecting the junction point and tap and compensating for a difference in winding part resistance and turns ratios required for equilibrium. A further impedance may be coupled across the rear lamp.

7 Claims, 8 Drawing Figures

CIRCUIT ARRANGEMENT FOR BICYCLE LIGHTING SYSTEMS

The present invention relates to circuit arrangements for bicycle lighting systems. Cycle lighting systems are generally divided into two groups, namely "parallel" or "series".

Figure 1:
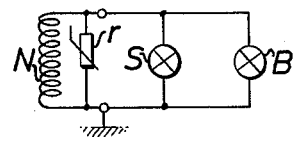
Figure 2:
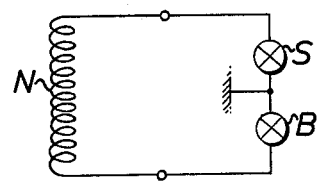
Figure 3:
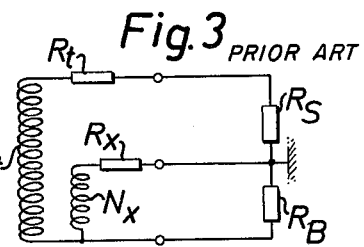
Figure 4:
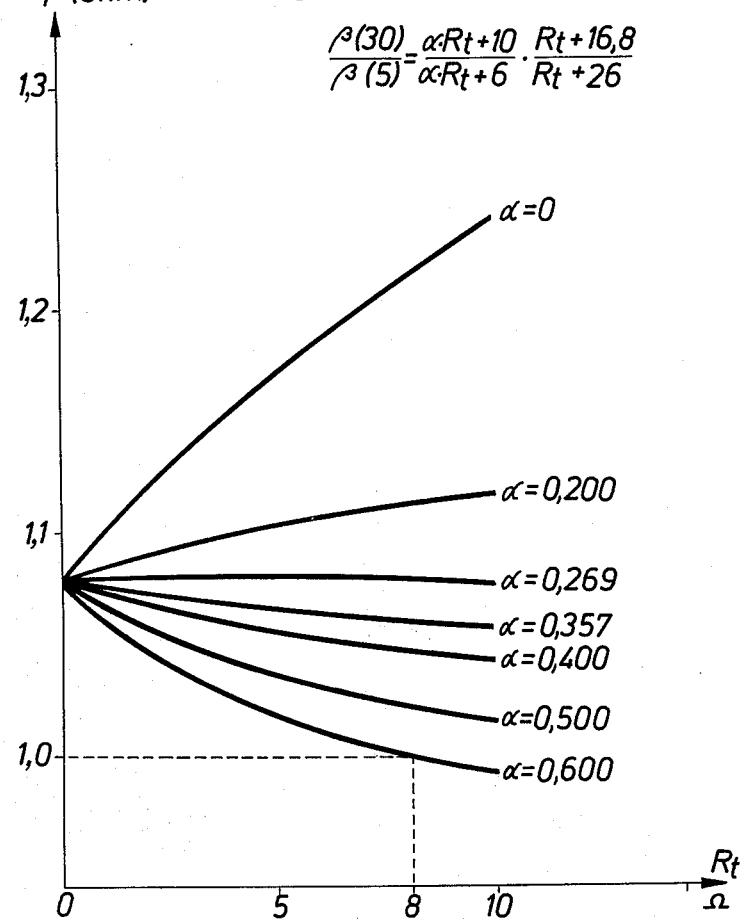

In order to give a short description of prior art the FIGS. 1–3 are referred to, showing circuit diagrams for bicycle lighting and FIG. 4 which is a diagram.

FIG. 1 shows a parallel system. An AC generator in the Figure, indicated by a coil N, feeds a head lamp S and a rear lamp B in a parallel circuit. In this case the head lamp is dimensioned for 2.4 W at 6 volt, the rear lamp is dimensioned for the same voltage although the wattage is only 0.6 W. This system usually requires a device for limiting voltage, e.g. a voltage dependent resistance $r$ which is also indicated in FIG. 1. This excessive voltage protector is to prevent the rear lamp, so important for traffic safety, from burning out if there should be a break in the head lamp.

The series system has been developed to circumvent special measures for limiting voltage. This system is shown in FIG. 2. The head lamp S and the rear lamp B are in series with the coil N. The head lamp is the same as in the parallel system, while the rear lamp has a higher wattage at the same voltage as the head lamp, i.e. 3 W at 6 volt. Since both lamps are passed through by the same current, the rear lamp has a reduced voltage and the light has a lower colour temperature, which is of no importance since the rear lamp displays a red light anyway. The rear lamp has thus a large life span. If there is a break in the one lamp, the other lamp becomes extinguished as well as the lighting system being completely out of operation.

To avoid this disadvantage there have been searches for suitable double circuit systems. A proposal for such a system has been published in the Swedish Pat. No. 335,767. The system is characterized by the generator having a coil system consisting of two coils $N_t$ and $N_r$ wound in the same direction, whereas the one coil, auxiliary coil $N_r$, has a lower resistance value than the main winding. FIG. 3 shows the circuit diagram for the proposed system, with all the parameters incorporated.

$N_t$ is the main winding with the total number of turns $N_t$, while $R_t$ is the total resistance of this winding, $N_r$ is the auxiliary winding with the number of turns $N_r$, and $R_r$ is the resistance of this auxiliary winding. $R_S$ and $R_B$ are the equivalent resistances of the head lamp and rear lamp bulbs respectively.

The auxiliary winding has several functions, viz.,

1. To induce a potential which is the same as the one prevailing at the junction between $R_S$ and $R_B$. The system will now be divided into two circuits with a bridge-like circuit. When there is equilibrium in this bridge circuit, no current goes through $N_r R_r$. The system would have the same characteristics as a pure series system according to the above, if the bridge equilibrium could be maintained within the working range of the lighting system. This is, however, not possible as a later analysis will show.

2. With a break in one of the lamps, e.g. the head lamp $R_S$, the rear lamp is fed from the auxiliary winding $N_r$. The auxiliary winding resistance $R_r$ is dimensioned in such a way that no excess voltages over $R_B$ can occur.

3. If $R_B$ represents the rear lamp according to the parallel system, with a lamp having considerably greater resistance (in the following denoted By $R_{BP}$) than in the series system, equilibrium is not possible. A differential current $I_S - I_{BP}$ flows through $R_r$ and generates there a potential drop $(I_S - I_{BP}) \cdot R_r$ which causes the voltage over $R_{BP}$ to be greater than in the series case previously discussed. $R_r$ is dimensioned in such a way that the voltages over $R_S$ and $R_{BP}$ will be alike and about the same as for the parallel system.

It has been found, however, that such a dimensioning in which the dynamo in question meets the requirements for both series and parallel systems is difficult to accomplish. The dynamo performance in the series case will either be insufficient for low voltages at some speed or other, or the voltages in the parallel mode will be too great. This is concerned with the fact that the series system requires more power from the dynamo than the parallel system. The following table I shows how much power the dynamo must supply to meet the specified minimum values of both types at different speeds.

TABLE I

| Speed | Total power (Watts) | | Power at the rear lamp (Watts) | |
|---|---|---|---|---|
| (km/h) | series | parallel | series | parallel |
| 5 | 1.33 | 1.03 | 0.52 | 0.21 |
| 15 | 3.15 | 2.80 | 1.14 | 0.56 |
| 30 | 3.48 | 2.82 | 1.23 | 0.57 |

In order to accomplish a dimensioning suitable for both systems, one has to:

a. prevent equilibrium losses in the series system branch $N_r R_r$ or/and b. introduce further loads in the parallel system.

An analysis of the above-mentioned series system shows that a complete balance in the system can only be provided for one resistance combination $R_S R_B$ and thus for one speed, since the resistance of the lamps increases with the applied voltage and furthermore not in the same degree. The following table II shows the equivalent resistance values for the different bulbs at different speeds according to the Swedish test specifications.

TABLE II

| Speed (km/h) | Head light lamp | Rear lamp (series system) | Rear lamp (parallel system) |
|---|---|---|---|
| 5 | 10.8 | 6 | 43.5 |
| 15 | 14.5 | 9 | 58 |
| 30 | 16 | 10 | 63.5 |

In the above mentioned Swedish Pat. No. 335,767 there is nothing said about a suitable ratio of the number of turns between the main winding and the auxiliary winding. An analysis of the system leads, however, to the following reasoning.

Equilibrium in the system according to FIG. 3 is accomplished if the following condition is met:

$$\frac{N_r}{N_t} = \frac{R_B}{R_t + R_S + R_B} = \beta \qquad (1)$$

$N_t$ and $N_r$ are the number of turns in the main and auxiliary winding respectively, which at the same time are a measure of the voltages generated in the windings while idling (without load). If the ratios of the number of turns for equilibrium at different speeds are calculated, it is found by inserting the corresponding resistance values $R_S$ and $R_B$ that the ratio of the number of turns $\beta$ varies. The ratio between equilibrium at 30 km/h and 5 km/h varies according to a function which is indicated in FIG. 4 by $\alpha=0$. Imbalance, i.e. the deviation from the sought value $$\frac{\beta(30)}{\beta(5)} = 1$$

increases with the resistance $R_t$ of the main winding, and is for example at $R_t = 10$ ohm as much as 24 %. The system therefore deviates from the performance of the pure series system at speeds for which the equilibrium condition is not met.

The present invention proposes systems in which the equilibrium in question is considerably improved. The distinguishing features for the present invention are set forth in the following patent claims.

The invention will now be more closely described while referring to FIGS. 5–8 on the attached drawings, these Figures illustrating embodiment examples by means of circuit diagrams.

Figure 5:
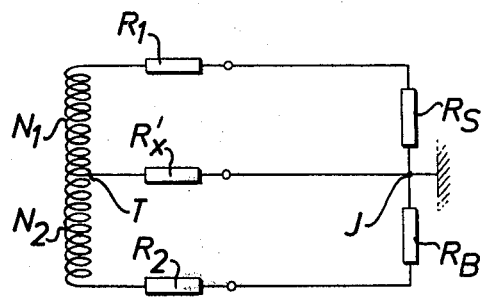

In the system according to FIG. 5 the main winding is divided into two portions $N_1$ and $N_2$ with a tap T. By this division two part resistances $R_1$ and $R_2$ are also obtained, where $R_1+R_2=R_t$, i.e. the total resistance corresponding to that of the winding $N_t$ shown in FIG. 3. The ratio $R_2/(R_1+R_2)=R_2/R_t$ will in the future be denoted by $\alpha$. $N_1+N_2$ are naturally equivalent to the total number of turns $N_t$ in the main winding in FIG. 3. The head lamp, denoted as before by $R_S$, is connected over the part winding $N_1$, while the rear lamp, denoted by $R_B$, is connected over the part winding $N_2$. The junction between $R_S$ and $R_B$ is denoted by J. A resistance $R'_x$ is connected between the winding tap T and the junction J.

The relationship between the part resistances $R_1$ and $R_2$ is not only dependent on the ratio of the number of turns, but also on the geometry of the main winding, since the part windings are placed in different parts in the coil, with great or less winding diameter and correspondingly great or less wire length and resistance respectively per turn. The condition for equilibrium in this system is:

$$\frac{N_2}{N_t} = \frac{R_2+R_B}{R_1+R_2+R_S+R_B} = \beta$$

and with $R_1 + R_2 = R_t$ and $R_2 = \alpha \cdot R_t$ $$\frac{N_2}{N_t} = \beta = \frac{\alpha \cdot R_t+R_B}{R_t+R_S+R_B} \qquad (2)$$

In calculating the resulting equilibrium conditions for the different speeds, it is found that imbalance between $\beta(30)$ and $\beta(5)$ will be less and less with an increasing $\alpha$. FIG. 4 shows the imbalance as a function of the total resistance of the winding for different $\alpha$ as parameters. With $\alpha=0.269$ the imbalance would be about 9 % for the resistances of the bulbs in question, and almost independent of the total resistance of the winding. Optimal equilibration occurs if the $\beta$-values for the different speeds are as equal as possible. Optimal equilibration can for example be defined by the ratio $$\frac{\beta(30)}{\beta(5)}$$

being equal to 1. For a dynamo resistance of 8 ohms this condition is met at $\alpha=0.6$. The corresponding $\beta$-value for the speed 15 km/h differs only inconsiderably herewith from the values for 5 and 30 km/h. If the number of turns is calculated for $\beta(15)$, then there is a complete equilibrium at this speed and an optimal equilibration within the whole of the speed range 5–30 km/h.

A double circuit series system with such an optimal equilibrium adjustment over the whole of the speed range would be dimensioned in the chosen example in the following manner.

Starting from a total number of turns, e.g. 400 turns, $N_2$ would be wound according to equation 2 with $$N_2 = 400 \cdot \frac{0.6 \cdot 8+R_B}{8+R_S+R_B}$$

turns

The number of turns $N_2$, with $R_B=9$ ohms and $R_S=14.5$ ohms (15 km/h case) will be $$N_2 = 0.438 \cdot 400 = 175 \text{ turns}$$

$N_2$ is less than half of the total number of turns $N_t$ while the resistance of the $N_2$ winding is to be 60 %, i.e. more than half of the total resistance $R_t$. This can be accomplished by winding the windings $N_1$ and $N_2$ with different wire dimensions and/or by placing the winding $N_2$ on the outer portion of the coil. A total resistance of the original value 8 ohms must of course be aimed at.

If a coil is wound with a certain number of turns and a certain resistance with two different wire dimensions, the volume of the coil will always be larger than if the coil is wound with only one wire dimension. If there is lack of winding space, it is therefore always more advantageous to wind the whole coil with a single wire dimension, which is also advantageous from the point of view of manufacture.

Figure 6:
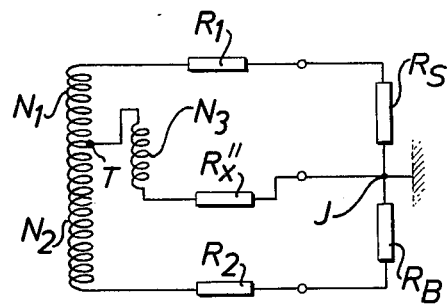

FIG. 6 shows how equilibration can be arranged with only one wire dimension in the main winding. For the sake of simplicity it is assumed that the resistances $R_1$ and $R_2$ are independent of the coil geometry and are only proportional to the number of turns $N_1$ and $N_2$.

In the above-mentioned example with optimal suiting of $\alpha$, $N_2$ would be 60 % of $N_t$, i.e. $0.6 \cdot 400 = 240$ turns. The equilibrium condition $\beta$, however, requires a number of turns which is equal to 175 according to the previous calculation. To meet both the requirements, an auxiliary winding $N_3$ is arranged having a number of turns corresponding to the difference between both the values, i.e. $240 - 175 = 65$ turns, and wound in the opposite direction to the main winding as shown in FIG. 6. Since optimal equilibrium prevails within the whole speed range 5–30 km/h, the resistance $R''_x$ of the winding $N_3$ can assume arbitrary values between 0 and $\infty$ without losses at one or the other speed occurring. Current in the branch is always zero. For the auxiliary winding, a resistance $R''_x$ is chosen which is so large that at a break in the head lamp circuit $R_S$, the voltage over $R_B$ does not increase to an undesired value. The same reasoning applies also for a breakage in the rear lamp circuit $R_B$.

In summary, the whole system is characterized electrically in that the main winding of the dynamo is divided into a resistive voltage ratio $\alpha$ and an inductive voltage ratio $\beta$. For optimal equilibration, the necessary resistive voltage ratio $\alpha$ results in a ratio of the number of turns which deviates from what is necessary for the inductive voltage ratio $\beta$ needed for equilibrium. The difference is compensated by a transformer-like auxiliary correction coil which puts the $\beta$-condition to the right value without affecting the $\alpha$-condition.

As chosen examples have shown, the new system requires less wire since the number of turns in the auxiliary coil winding is considerably less than in the system according to FIG. 3, while the main winding in unaltered with the exception of the tap.

As may be easily seen, with a falling $\alpha$-value the number of turns in the auxiliary coil will be less and less until a special case can be found where the number of turns is zero according to FIG. 5. On further reduction of $\alpha$ the number of turns increases again although with reversed winding direction until a maximum is obtained at $\alpha=0$, i.e. with a non-divided main winding of the configuration described for FIG. 3 and the above mentioned Swedish Pat. No. 335,767.

There is sometimes desired for a cycle dynamo to be used both as a double circuit series mode generator and a double circuit parallel mode generator. As previously mentioned the difference in both the systems consists in the equivalent resistance for the rear lamp bulb $R_B$ in the parallel system being considerably greater than in the series system. A requirement for a double circuit parallel system is that the voltages over the equivalent resistances for the head lamp and the rear lamp are about the same. As has been mentioned, this requirement can be met by suitably dimensioning the resistance $R'_r$ and $R''_r$ (FIGS. 5–6). The corresponding resistance value is calculated with help of the formula:

$$R_x = \frac{R_s}{1 - \frac{R_s}{R_{BP}}} \left[ (1 - 2\beta) - \left( \frac{\beta(1-\alpha)}{R_s} - \frac{\alpha(1-\beta)}{R_{BP}} \right) \cdot R_t \right] \quad (3)$$

$R_{BP}$ in the equation is the equivalent resistance for the rear lamp bulb in the parallel system.

$R'_r$ is also to function as excess voltage protection if one of the lamp circuits is ruptured, and to introduce an additional load into the parallel system for compensating the lower power requirement of the parallel system. The term $(1-2\beta)$ is the most dominating in the square brackets. $\beta$-values in the vicinity of 0.5 cause the resistance $R'_r$ to have such low values that it is impossible to achieve sufficiently large loading this way. The combination system series-parallel must therefore be a compromise. One is compelled to work with lower $\beta$-values and thereby lower $\alpha$-values, which means that optimal equilibrium in the series case is not possible. Losses arise with falling $\alpha$-values and it may happen that a converging compromise solution is not possible.

A way out of this problem is to introduce according to the invention an additional load which primarily makes itself felt in the parallel system. This can be done by placing for example a loss resistance $R_p$, FIG. 7, in the dynamo casing and coupling it between earth J and the output for the rear lamp. In this position the parallel resistance $R_p$ only causes an inconsiderable extra load to occur in the series system (due to the low equivalent resistance value $R_B$), while the extra loading in the parallel system with its higher $R_B$ is appreciable. The parallel resistance also naturally affects the condition for optimal equilibrium in the direction of making the optimal $\alpha$-value lower whereby $\beta$ will also be lower, $R'''_r$ will be higher and everything goes in the right direction.

Figure 8:
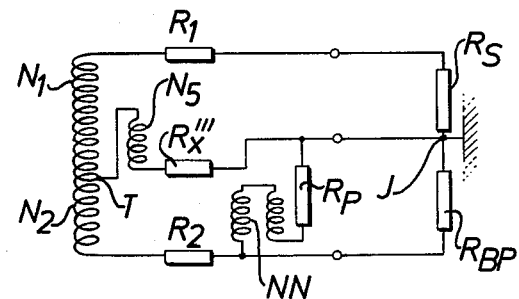

The parallel resistance $R_p$ can be a separate component arranged somewhere within the generator casing; it can also be made in the form of an insulated resistance wire which is wound bifilarly above the coil according to FIG. 8, so that no voltages are induced in this winding NN.

Figure 7:
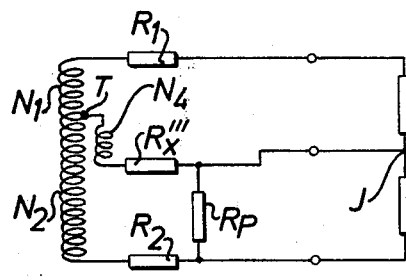

In conclusion and in reference to FIGS. 7 and 8, the examples discussed above will be calculated with an additional loading resistance of $R_p=100$ ohm. The values for the rear lamp circuit equivalent resistance given in table II will hereby be altered to the following values:

TABLE III

| Speed (km/h) | Head lamp circuit (Unaltered values) (ohms) | Rear Lamp circuit (Series system) (ohms) | Rear Lamp circuit (parallel system) (ohms) |
|---|---|---|---|
| 5 | 10.8 | 5.66 | 30.3 |
| 15 | 14.5 | 8.26 | 36.7 |
| 30 | 16 | 9.10 | 38.8 |

For these values $\alpha_{opt}$ will be:

$$\alpha_{opt} = \frac{7.72 + 3.44 \cdot R_t}{8.74 \cdot R_t}$$

and $R_t = 8$ ohms:

$$\alpha_{opt} = 0.5$$

With $\alpha = 0.5$ the value $\beta$ will be according to the following:

$$\beta = \frac{\alpha \cdot R_t + 8.26}{R_t + 22.76}$$

and with $R_t = 8$ ohms:

$$\beta = 0.4$$

For $\alpha = 0.5$, and for a coil with a certain geometric configuration the following will be obtained by calculation:

$$N_2/N_t = 0.475$$

and with $N_t = 400$:

$$N_2 = 190 \text{ turns.}$$

Optimal equilibrium prevails with $\beta = 0.4$, at $0.4 \cdot 400 = 160$ turns.

The number of turns in the auxiliary winding is only: $190 - 160 = 30$ turns.

Optimal conditions are now achieved according to the above during different speed conditions.

What is claimed is:

1. A circuit arrangement for bicycle lighting systems and the like, comprising:
   a dynamo having a winding provided with a tap dividing the winding into two parts;
   a front lamp connected to a first of said winding parts;
   a rear lamp connected to the second winding part, said lamps being interconnected by a junction point;
   an impedance connected between the tap and the lamp junction point and of preselected value;
   the number of turns and the resistance of said first winding part and the number of turns and resistance of said second winding part being such as to establish system equilibrium, wherein the potential of the tap is the same as the potential of the lamp junction point, during normal operation conditions with lamp resistances varying.

2. A circuit arrangement as claimed in claim 1, wherein said impedance is a resistance current limiter active only if a lamp breaks.

3. A circuit arrangement for bicycle lighting systems and the like, comprising:
   a dynamo having a winding provided with a tap dividing the winding into two parts;
   a front lamp circuit connected to a first of said winding parts;
   a rear lamp circuit connected to the second winding part, and a junction point connecting said first and second lamp circuits;
   a further winding connected between the tap and the lamp junction point;
   the resistances of said first and second winding parts being related to the resistances of said first and second lamps, respectively, and the winding direction and number of turns of said further winding being such as to establish system equilibrium, wherein substantially no current flows in the said further winding during normal operation conditions.

4. A circuit arrangement as claimed in claim 3, wherein the resistance of the further winding defines a current protective resistance for limiting the voltage on one said lamp to a non-damaging level upon failure of the other said lamp.

5. A circuit arrangement as claimed in claim 4, wherein a further impedance is connected in parallel across the rear lamp circuit.

6. A device as claimed in claim 5, wherein said further impedance is a resistance.

7. A device as claimed in claim 5, wherein said further impedance is a bifilar winding having an inherent resistance.

* * * * *